United States Patent
Adams et al.

(10) Patent No.: US 10,807,448 B2
(45) Date of Patent: Oct. 20, 2020

(54) VEHICULAR HEADLIGHT DETECTION AND REACTION SYSTEM

(71) Applicant: BlackBerry Limited, Waterloo (CA)

(72) Inventors: Neil Patrick Adams, Waterloo (CA); Jeremy Lawson Kominar, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 106 days.

(21) Appl. No.: 16/151,542

(22) Filed: Oct. 4, 2018

(65) Prior Publication Data

US 2020/0108699 A1 Apr. 9, 2020

(51) Int. Cl.
| | |
|---|---|
| *B60J 3/04* | (2006.01) |
| *B60J 3/02* | (2006.01) |
| *B60Q 1/08* | (2006.01) |

(52) U.S. Cl.
CPC .............. *B60J 3/04* (2013.01); *B60J 3/0291* (2013.01); *B60Q 1/085* (2013.01)

(58) Field of Classification Search
CPC ........... B60J 3/04; B60J 3/0291; B60Q 1/805; B60Q 1/085
See application file for complete search history.

(56) References Cited

U.S. PATENT DOCUMENTS

| | | |
|---|---|---|
| 2002/0196635 A1 | 12/2002 | Devolpi |
| 2008/0294315 A1 | 11/2008 | Breed |
| 2013/0073144 A1 | 3/2013 | Huster et al. |
| 2014/0145838 A1 | 5/2014 | Tuukkanen |
| 2018/0093604 A1 | 4/2018 | George et al. |
| 2018/0178711 A1 | 6/2018 | Wang et al. |

FOREIGN PATENT DOCUMENTS

| | | |
|---|---|---|
| CN | 1057304444 A | 7/2016 |
| EP | 3339096 A1 | 6/2018 |
| JP | 20130193644 A | 9/2013 |

OTHER PUBLICATIONS

EPO: Extended European Search Report relating to EP application No. 19201033.8, dated Jan. 7, 2020.

*Primary Examiner* — D Glenn Dayoan
*Assistant Examiner* — Melissa Ann Bonifazi
(74) *Attorney, Agent, or Firm* — Rowand LLP

(57) ABSTRACT

Methods and systems to mitigate headlight blinding during travel in a vehicle by relaying location data from vehicles to a remote server. The remote server identifies vehicles approaching each other on an otherwise unoccupied roadway and sends one or more of those vehicles a warning signal. The vehicle receiving such as warning signal may then automatically take a headlight mitigation action.

18 Claims, 4 Drawing Sheets

VEHICULAR HEADLIGHT DETECTION AND REACTION SYSTEM

FIELD

The present application generally relates to vehicular headlight detection and reaction systems and, in particular, vehicular systems and methods for anticipating headlights that may disturb a driver and taking pre-emptive action.

BACKGROUND

When driving at night, headlights help drivers see the roadway and make the vehicle visible to others. Headlights typically have a low beam setting for illuminating the roadway immediately ahead and making the vehicle visible to others, and a high beam setting that directs more intense light at a more elevated beam path to illuminate further down the roadway and wash the roadsides in light so that the driver can better see upcoming roadway and roadside hazards in dark conditions, particularly on rural highways with no street lights. One of the problems with high beams is that they shine intense light into the cabins of oncoming vehicles, which can disturb and temporarily blind drivers of those oncoming vehicles. For this reason, drivers are often trained to manually switch their high beams to low beams if they see an oncoming vehicle. However, some drivers forget this courtesy or fail to make the switch until the temporary blinding has already occurred.

Systems have been proposed to detect the headlights of incoming traffic and take action such as dimming the lights of the present vehicle. These systems typically use radar or a camera and image analysis to identify or recognize oncoming vehicle and/or headlights.

As with the manual reaction of drivers, reliance on automated recognition of oncoming headlights may result in a reaction that is too late, as the oncoming headlights may be encountered suddenly. Also, some such systems may only react by dimming a vehicle's own lights which only addresses the risk of blinding other driver, and not the risk of being blinded by the oncoming vehicle lights.

It would be helpful to provide for methods and systems that, at least in part, address some of these shortcomings or provide for other advantages in mitigating against potential temporary headlight blinding when traveling in a vehicle.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
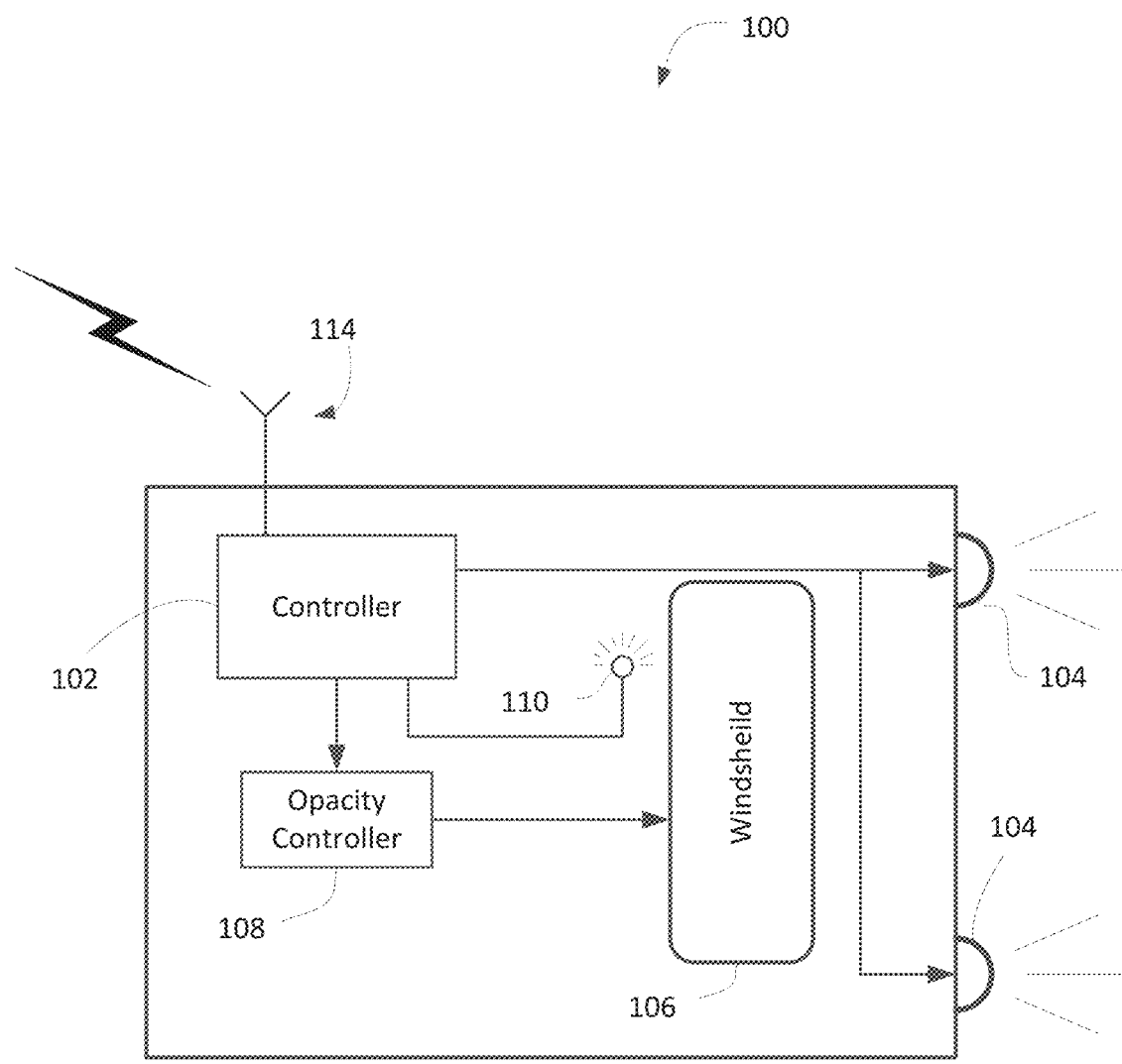
FIG. 1 shows a block diagram of an example vehicle having a system to mitigate against driver disturbance from oncoming headlights.

In a first aspect, the present application describes example methods and systems to mitigate headlight blinding during travel in a vehicle by relaying location data from vehicles to a remote server. The remoter server may identify vehicles approaching each other on an otherwise unoccupied roadway and send one or more of those vehicles a warning signal. The vehicle receiving such a warning signal may then automatically take a headlight mitigation action.

In another aspect, the present application describes a method of mitigating headlight blinding during travel in a vehicle. The method may include wirelessly sending location data regarding the geographic location of the vehicle to a remote server; receiving a warning signal from the remote server indicating an approaching vehicle; and automatically taking a headlight mitigation action in response to the warning signal.

In yet a further aspect, the present application describes a system to mitigate headlight blinding during travel in a vehicle. The system may include a server having memory, a processor, and processor-executable instructions stored in the memory that, when executed, cause the processor to: receive location information from other vehicles; calculate vehicle trajectories; determine that the vehicle and an approaching vehicle are at least a first distance apart on a roadway and that their respective trajectories are towards each other; and, based on that determination, generate and transmit a warning signal to the vehicle to cause the vehicle to automatically take a headlight mitigation action in response to the warning signal.

In yet another aspect, the present application describes A vehicle implementing a headlight blinding mitigation process. The vehicle may include a controller to control vehicle components and to communicate wirelessly with a remote server to send location data regarding the geographic location of the vehicle and to receive a warning signal from the remote server indicating an approaching vehicle; and headlights controllable by the controller and having a low beam setting and a high beam setting. The controller may automatically take a headlight mitigation action in response to the warning signal.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Automobiles of various types typically include headlights that shine in a generally forward direction to illuminate the roadway ahead. Headlights may be designed to have more than one intensity, often through the use of more than one bulb within a headlight, or through provision of multiple pairs of headlights. For example, a regular or low beam headlight may be used to see the roadway, during fog or other precipitation events, and to improve visibility of the vehicle to other drivers. High beam headlights are typically brighter and have wider and higher beam focus to illuminate more of the roadway, further down the roadway, and/or more objects to either side of the roadway. High beams are typically used on empty roadways, particularly rural roads not otherwise illuminated by streetlights, at night to improve the driver's vision of the roadway and potential hazards. Some vehicles may also be equipped with low level always-on running lights to illuminate the vehicle and make it easier for other drivers to see even when the headlights are not on.

One of the hazards of using high beams is that they shine a somewhat intense light into the cabins of oncoming vehicles. This can temporarily blind the driver of the oncoming vehicle and may be a safety hazard. Accordingly, drivers are encouraged to manually switch from high beam headlights to low beam headlights when they visually identify an oncoming vehicle.

When travelling at night on rural highways, it is often possible to identify an oncoming vehicle at a distance and reduce headlight intensity in time to avoid disturbing the vision of the other driver. However, sometimes due to sharp curves in the roadway and roadside obstructions, like trees, cliffs, etc., an oncoming vehicle is encountered suddenly and one or both drivers fail to react quickly enough to reduce headlight intensity. In some cases, a driver simply neglects to reduce headlight intensity.

It may be possible to equip a first vehicle with a camera or other machine vision device to attempt to visually recognize the headlights of an oncoming vehicle and automatically cause a reduction in intensity of the headlights of the first vehicle, i.e. switch from high beams to low beams. However, this may not address the problem of a suddenly encountered oncoming vehicle. By the time the machine vision system recognizes the oncoming vehicle the high beam headlights of the first vehicle may have already temporarily blinded the driver of the oncoming vehicle.

Accordingly, the present application proposes methods and systems to mitigate headlight blinding during travel in a vehicle by relaying location data from vehicles to a remote server, which identifies vehicles approaching each other on an otherwise unoccupied roadway and sends those vehicles a warning signal. The vehicle may then automatically take a headlight mitigation action. The headlight mitigation action may include warning the driver, automatically dimming the headlights from high beam to low beam, increasing the opacity of the windshield, and/or controlling a light source to pre-dilate the driver's eyes so as not to be blinded by oncoming headlights. Other headlight mitigation actions will be appreciated by those skilled in the art having regard to the description below. Some of those headlight mitigation actions reduce the likelihood that the headlights of the vehicle will disturb the driver of another vehicle, and some of those headlight mitigation actions reduce the likelihood that the driver of the vehicle will be disturbed by the headlights of another vehicle. In some cases, more than one headlight mitigation action may be taken by a vehicle in response to the warning signal from the remote server.

The remote server may receive vehicle data from a number of vehicles. The vehicle data includes location data regarding the vehicle. The location data may include, for example, GPS coordinates, speed, orientation, acceleration, or other such data. The location data enables the remote server to locate the vehicle in a geographic mapping space and, in some cases, to determine the vehicle's trajectory or direction of travel. The geographic mapping space may include information regarding roadways, such that the remote server is able to identify a vehicle as traveling on a particular roadway. In some cases, the vehicle data may include additional information regarding the state of the vehicle, such as whether the vehicle's headlights are illuminated and/or whether the headlights on a low beam or high beam setting.

The remote server may identify when two vehicle are approaching each other under conditions in which the headlights of at least one of the vehicles may disturb the driver of the other vehicle. Conditions might include the time of day, e.g. after sundown and before sunrise, whether at least one of the vehicles reports that their headlights are on, whether the roadway has streetlights, whether there is another vehicle between those two vehicles on the roadway since that other vehicle would likely prompt an earlier reaction by at least one of the two vehicles, such as reducing headlight intensity by switching from high beams to low beams. If the remote server determines that two vehicles are approaching each other under certain conditions, then the remote server may send one or both of the vehicles a warning message. The warning message may, in some cases, be a simple notification to dim headlights. In some cases, it may contain additional information, such as the distance of the approaching car, its speed, the time at which headlights are to be dimmed, or the time at which the approaching car will be encountered given the current speeds of both vehicles.

In response to receipt of the warning message, a vehicle may take one or more headlight mitigation actions, as described.

Reference is now made to FIG. 1, which shows, in block diagram form, a simplified vehicle 100. The vehicle 100 includes a controller 102. The controller 102 may include one or more processors, memory, executable program instructions, and various input, output, and communications subsystems. The vehicle 100 may include one or more wireless antennas 114 to enable wireless communication with remote devices, including through cellular data communications, wireless local area networks, dedicated short-range communications (DSRC), or any other wireless communications protocol. The controller 102 may be implemented by, or a part of, the vehicle electronic computer system that controls various aspects of the vehicle operation and a plurality of sensors that gather vehicle data.

The vehicle 100 includes one or more headlights 104. In this example, the vehicle 100 shows a standard pair of headlights 104. Each headlight 104 has at least two intensity settings or levels, e.g. low beam and high beam, and each headlight 104 is coupled to the controller 102 such that the controller 102 is capable of causing the headlight 104 to switch on or off, and is capable of controlling the intensity setting or level of output, e.g. whether the low beams or high beams are on. It will be appreciated that the intensity setting/level may be controlled by controlling whether a high beam bulb is illuminated or not in some implementations. In some implementations, the intensity level may be controllable for a single bulb. In some implementations, a headlight may contain multiple bulbs, each of which has an intensity that is controllable. In some implementations, a headlight may contain multiple bulbs, each of which is either on or off with no per bulb intensity control. The present application may be applicable to any such situations.

The vehicle 100 may include a windshield 106 having an electrically controlled opacity. That is, the windshield 106, or at least a portion thereof, may be dimmable. Under the control of an opacity controller 108, the windshield 106 may be made more transparent or darker. By making the windshield 106 more opaque, the intensity of oncoming headlights may be lessened, thereby reducing the impact on visibility for the driver. The opacity controller 108 may control one or more electrical signals that govern the opacity of the dimmable windshield 106. The opacity controller 108 may control the windshield opacity in response to signals from the controller 102.

In some cases, the vehicle 100 may be equipped with a light 110 within the cabin and within the general line-of-sight of the driver of the vehicle 100. The light 110 may be used as a mock headlight to cause dilation of the driver's pupils in anticipation of the high beam of an oncoming vehicle to prevent sudden temporary blinding of the driver. The light 110 may be built in the dashboard, reflected off the interior of the windshield 106, built into the car roof, or otherwise positioned so as to cause dilation of the driver's pupils when illuminated. To avoid temporarily blinding the driver, the light 110 may be controlled by the controller 102 to gradually increase in intensity to cause a gradual dilation of the pupils, thereby adjusting the driver's eyes in anticipation of oncoming vehicle headlights.

Figure 2:
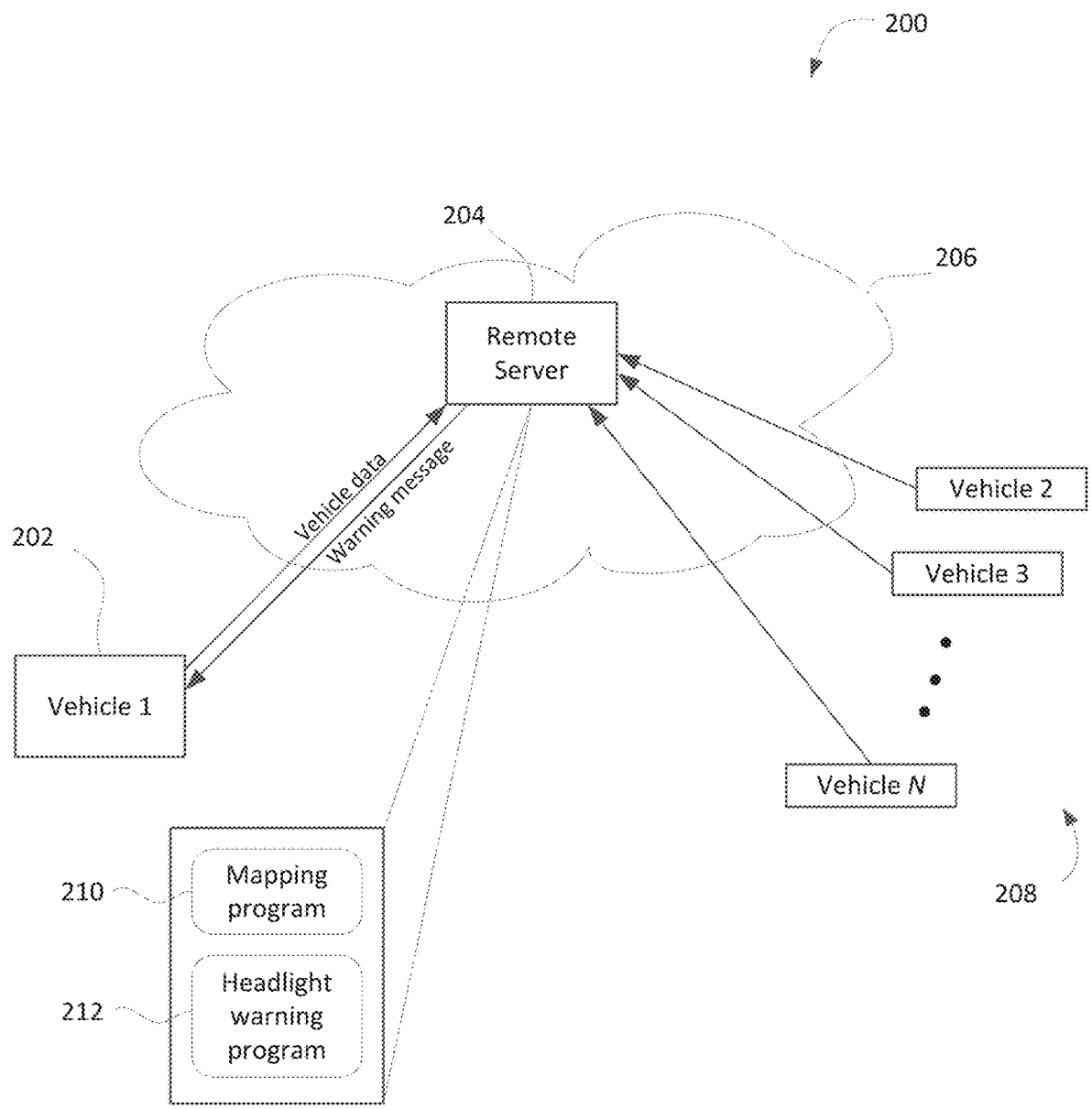
FIG. 2 diagrammatically shows an example of a system for anticipatory identification of likely headlight disturbances.

Reference is now made to FIG. 2, which diagrammatically illustrates an example system 200 to mitigate headlight blinding during travel in a vehicle. The system includes a first vehicle 202 in wireless communication with a remote server 204. The system further includes a plurality of vehicles 208 that are also in wireless communication with the remote server 204. The remote server 204 may include one or more computing devices connected to one or more wired and/or wireless networks 206, such as the Internet and one or more public land mobile networks (e.g. cellular data networks), and configured for data communication with the first vehicle 202 and the plurality of vehicles 208.

The remote server 204 may include one or more processors, memory, and processor-executable instructions that, when executed, cause the processors to carry out one or more of the operations described herein. The processor-executable instructions may be in the form of modules, applications, or other computer programs, and may be standalone programs or incorporated into larger programs relating to vehicles.

As an example, the remote server 204 may include a mapping program 210 and a headlight warning program 212. The mapping program 210 may, when executed, receive GPS or other location data from the vehicles 202, 208, and/or trajectory data, and may determine one or more vehicle paths in a mapped environment. The mapping program 210 may include storage of, or access to, a geographic information system (GIS) for terrestrial roadway geography information. In some cases, the mapping program 210 may interface with one or more third party GIS system, such as Google Maps™, or with governmental mapping or traffic data systems. The map data obtained regarding the geographic environment may include roadway information indicating the locations of roadways.

The headlight warning program 212 may, in concert with the mapping program 210, identify when two vehicles are approaching each other on the same roadway under conditions that may merit a headlight warning message. If so, then the headlight warning program 212 may generate and transmit the headlight warning message to one or both of the vehicles. The determination may be based, in part, on determining that the two vehicles are on the same roadway and more than a first distance apart, since if they are too close together then the opportunity to avoid possible headlight blinding has passed. The determination may further be based on determining that the two vehicle are less than a second distance apart, where the second distance is larger than the first distance, since if the two vehicle are very distant it may be premature to prompt any headlight mitigation action as circumstances may change before the vehicles encounter each other. The determination may further be based on a number of conditions. As examples, some of which may be applied in combination or sub-combination, conditions may make the warning dependent upon the time of day (only applicable at night), the weather status, whether the vehicles have reported that their headlights are on or off, whether the vehicles have reported that they are using high beams, whether there are any vehicles between the two vehicles on the roadway, whether the roadway has street lighting, etc.

Figure 3:
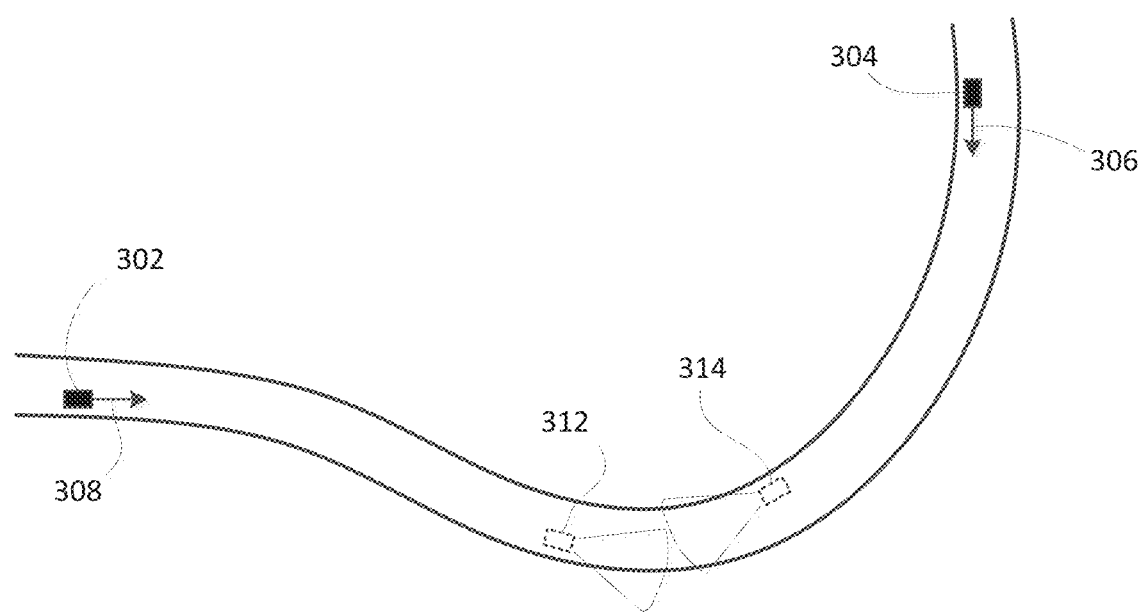
FIG. 3 diagrammatically illustrates an example roadway and two approaching vehicles.

FIG. 3 diagrammatically illustrates an example roadway 306. A first vehicle 302 and a second vehicle 304 are shown in the roadway 306. Each vehicle 302, 304 transmits vehicle data to a remote server (not shown), including its location and, in some cases, other vehicle data such as orientation, speed, trajectory, headlight status or setting, or other parameters. From the vehicle data, the remote server is able to determine a first trajectory 308 for the first vehicle 302, and a second trajectory 310 for the second vehicle 304.

Information regarding the roadway 306, such as its path and location, may be obtained by the remote server from a third-party geographic information source. The remote server may determine that the locations of the first vehicle 302 and second vehicle 304 and their respective trajectories 308, 310 indicate that they are on the same roadway and approaching each other. Additional conditions or constraints, such as that the first vehicle 302 and second vehicle 304 are more than a first distance apart and less than a second distance apart, may be evaluated by the remote server to identify whether the two vehicles should be warned about headlight status. In some cases, the evaluation of distance may be absolute geographic distance between the two vehicles, or may be distance along the path of the roadway, since it may curve.

The remote server may also evaluate one or more preconditions. For example, the remote server may be configured to only undertake headlight analysis as described herein during certain hours of the day, e.g. after sundown and before sunrise, or based on certain environmental light conditions in an area as reported by one or more sensors located on one or more vehicles or supplied from a third-party information source. Another example precondition is determining, from vehicle data, that at least one of the two vehicles 302, 304 has illuminated headlights and, in particular, high beams.

In some implementations, certain conditions in the roadway may increase the likelihood that the remote server identifies that the two vehicles 302, 304 are approaching each other on the same roadway under conditions that may merit a headlight warning message. For example, if the roadway is of a certain category, e.g. rural highway, it may be more likely to lack street lighting, which makes it more likely the vehicles are using high beams, than roadways of some other categories, e.g. residential streets or dense urban settings. As another example, curves or hills on the roadway between the two vehicles 302, 304 make it more likely that the vehicles will encounter each other with a more sudden headlight event, making it more likely that a driver may be temporarily blinded or forced to look away from the roadway as a result of the sudden appearance of oncoming high beams.

In yet some implementations, the remote server may also make warning two approaching vehicles about headlight status conditional on there being no other vehicles between them on the roadway. That is, if there is another vehicle on the roadway between the first vehicle 302 and the second vehicle 304, then the closest pair of approaching vehicles is the other vehicle and either the first vehicle 302 or the second vehicle 304. Accordingly, assuming that the other vehicle is equipped to receive and react to warning signals, the remote server may carry out its functions by treating the other vehicle as one of the pair of approaching vehicles using the operations described herein. If the other vehicle is not equipped to received and react to warning signals regarding headlights (a capability that may be signaled by the vehicles in the vehicle data they transmit to the remote server), then the remote server may nevertheless send a warning signal to either the first vehicle 302 or the second vehicle 304 (dependent upon which of them is in the pairing with the other vehicle).

Referring still to FIG. 3, when the remote server identifies the first vehicle 302 and the second vehicle 304 as approaching each other in the roadway 306, and determines that prescribed conditions are met for warning the vehicles about headlight illumination (for example, using some or all of the conditions described above), then it transmits the warning signal to the vehicles 302, 304. It may transmit the warning signal immediately, or it may wait until the vehicles 302, 304 are closer together. That is, it may be too early to cause headlight mitigation action. In some cases, the identification of the vehicles may occur at a particular distance, but mitigation actions may not be appropriate until the vehicles 302, 304 are closer, such that they are in sufficiently close proximity to each other than the high beams may be about to disturb the other driver, such as is indicated using reference numerals 312 and 314. The remote server may delay sending the warning message and may continue to monitor the vehicles 302, 304 via the vehicle data to update the assessment of whether a warning is required. For example, the vehicles 302, 304 may report that their high beams have been manually switched to low beam, making the warning unnecessary. Alternatively, the remote server may send the warning message when the vehicles are at the particular distance with instructions to apply a headlight mitigation action after a specified interval of time or travel distance.

The vehicles 302, 304 receive the warning message from the remote server and take a headlight mitigation action. The action may include warning the vehicle occupant using a visual, auditory or kinetic output to signal that there is an oncoming vehicle. A different warning or multiple warnings may be issued to signal two situations: (a) the present vehicle is using high beams and may disturb the driver of the other vehicle, or (b) the other vehicle is using high beams and they may disturb the driver of the present vehicle.

Instead of or in addition to warning the vehicle occupants, the headlight mitigation action may include automatically dimming vehicle headlights, e.g. switching from high beams to low beams, increasing opacity of a windshield to dim the appearance of oncoming high beams, and/or preemptively dilating the driver's eyes using a gradually illuminated light in the cabin to prevent sudden blinding by the appearance of oncoming high beams.

Figure 4:
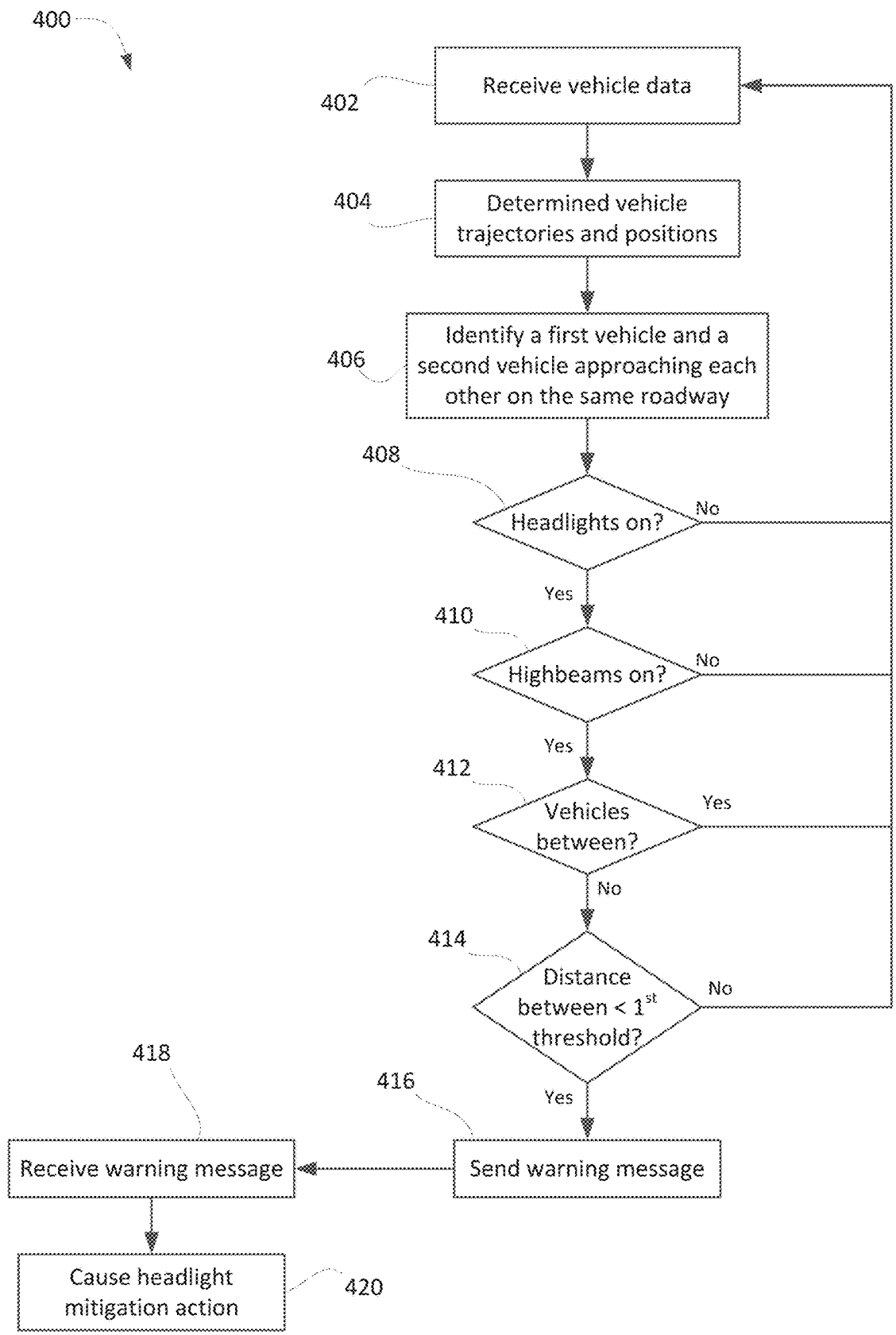
FIG. 4 shows, in flowchart form, one example method for advance action against an anticipated driver disturbance due to headlights.

Reference is now made to FIG. 4, which shows, in flowchart form, one example method 400 of mitigation headlight blinding during travel in a vehicle. Parts of the method 400 may be implemented by a remote server in communication with a plurality of vehicles. Parts of the method 400 may be implemented by a vehicle that receives a warning message from the remote server.

The method 400 may include receiving vehicle data from a plurality of vehicles in operation 402. The vehicle data may include location data and/or trajectory information for a particular vehicle. It may further include vehicle status or status change information relating to the headlight settings. That is, it may indicate whether the headlights are illuminated and whether they are set to high beams or low beams. The vehicle data may, in some cases, indicate environmental factors, such as ambient light levels outside the vehicle.

In operation 404, the remote server determines vehicle trajectories and locations in the context of a geographic location. That is, the received vehicle data is combined with map data to determine where each vehicle is located in a road network and the directions of travel of each vehicle. The remote server may then identify, in operation 406, a first vehicle and a second vehicle in the same roadway and approaching each other. Various conditions may be applied in identifying the approaching vehicles. Example conditions are graphically illustrated as separate decisions in FIG. 4 for ease of discussion, but may be incorporated into operation 406. As an example, in operation 408 the remote server may evaluate whether at least one of the vehicles has its headlights on. Additionally or alternatively, the remote server may evaluated whether at least one of the vehicle has its high beams on, as indicated by operation 410. Operation 412 shows the condition that there are no vehicle between the first and second vehicle in the roadway. Operation 414 applies the condition that the two vehicles are less than a first distance apart in the roadway. Other conditions may be applied, as discussed. Some conditions may be specific to identifying whether the two vehicles merit a warning, such as the nature of the roadway being travelled. Other conditions may be general pre-conditions to operation of the method, such as the time of day or ambient outdoor light level for the geographic area.

In operation 416, assuming the remote server has identified the first and second vehicle and all applicable conditions are met, then it generates a warning signal to at least one of the vehicles.

The at least one vehicle receives the warning signal in operation 418 and causes a headlight mitigation action to occur in operation 428.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of mitigating headlight blinding during travel in a vehicle, the method comprising:
   wirelessly sending location data regarding the geographic location of the vehicle to a remote server;

receiving a warning signal from the remote server indicating an approaching vehicle; and automatically taking a headlight mitigation action in response to the warning signal, wherein the vehicle includes a windshield having an electrically-controlled opacity, and wherein the headlight mitigation action includes increasing an opacity of the windshield to dim the appearance of lights on the approaching vehicle.

2. The method of claim 1, wherein the headlight mitigation action includes reducing the intensity of light output of one or more headlights on the vehicle.

3. The method of claim 1, wherein the headlight mitigation action includes gradually illuminating a light within the vehicle and within a driver's line-of-sight, the light mimicking expected headlights on the approaching vehicle to promote dilation of the driver's eyes.

4. The method of claim 1, wherein the vehicle includes a global positioning system device for determining local coordinates, and wherein the location data includes the local coordinates.

5. The method of claim 1, further comprising, at the remote server, receiving location information from other vehicles;
calculating vehicle trajectories;
determining that the vehicle and the approaching vehicle are at least a first distance apart on a roadway and that their respective trajectories are towards each other; and
based on that determination, generating the warning signal.

6. The method of claim 5, wherein determining further includes determining that no vehicles are located on the roadway between the vehicle and the approaching vehicle.

7. The method of claim 5, wherein determining further includes determining that at least one of the vehicle and the approaching vehicle have illuminated headlights.

8. The method of claim 7, wherein determining that at least one of the vehicle and the approaching vehicle have illuminated headlights includes determining that at least one of the vehicles is using high-beams.

9. The method of claim 5, wherein determining further includes determining that the vehicle and the approaching vehicle are less than a second distance apart, where the second distance is greater than the first distance.

10. A system to mitigate headlight blinding during travel in a vehicle, the system comprising:

a server having memory, a processor, and processor-executable instructions stored in the memory that, when executed, cause the processor to:
receive location information from other vehicles;
calculate vehicle trajectories;
determine that the vehicle and an approaching vehicle are at least a first distance apart on a roadway and that their respective trajectories are towards each other; and
based on that determination, generate and transmit a warning signal to the vehicle to cause the vehicle to automatically take a headlight mitigation action in response to the warning signal,
wherein the vehicle includes a windshield having an electrically-controlled opacity, and wherein the headlight mitigation action includes increasing an opacity of the windshield to dim the appearance of lights on the approaching vehicle.

11. The system claimed in claim 10, wherein the instructions, when executed, further cause the processor to determine by determining that no vehicles are located on the roadway between the vehicle and the approaching vehicle.

12. The system claimed in claim 10, wherein the instructions, when executed, further cause the processor to determine by determining that at least one of the vehicle and the approaching vehicle have illuminated headlights.

13. The system claimed in claim 12, wherein determining that at least one of the vehicle and the approaching vehicle have illuminated headlights includes determining that at least one of the vehicles is using high-beams.

14. The system claimed in claim 10, wherein the instructions, when executed, further cause the processor to determine by determining that the vehicle and the approaching vehicle are less than a second distance apart, where the second distance is greater than the first distance.

15. A vehicle implementing a headlight blinding mitigation process, the vehicle including:

a windshield having an electrically-controlled opacity;
a controller to control vehicle components and to communicate wirelessly with a remote server to send location data regarding the geographic location of the vehicle and to receive a warning signal from the remote server indicating an approaching vehicle; and
headlights controllable by the controller and having a low beam setting and a high beam setting,
wherein the controller is to automatically take a headlight mitigation action in response to the warning signal,
and wherein the headlight mitigation action includes the controller outputting a signal causing an increase in opacity of the windshield to dim the appearance of lights on the approaching vehicle.

16. The vehicle claimed in claim 15, wherein the headlight mitigation action includes the controller causing the headlights to switch from the high beam setting to the low beam setting.

17. The vehicle claimed in claim 15, further comprising a light within the vehicle and within a driver's line-of-sight to promote dilation of the driver's eyes, and wherein the headlight mitigation action includes the controller causing gradual illumination of the light.

18. The vehicle claimed in claim 15, further including a global positioning system device for determining local coordinates, and wherein the location data includes the local coordinates.

* * * * *